United States Patent
Vermilyea et al.

(10) Patent No.: US 8,037,843 B2
(45) Date of Patent: Oct. 18, 2011

(54) RESIN APPLICATION AND INFUSION SYSTEM

(75) Inventors: Mark Ernest Vermilyea, Niskayuna, NY (US); Peter Michael Finnigan, Clifton Park, NY (US); Dongming Dominic Gao, Clifton Park, NY (US); Bowden Kirkpatrick, Bennington, VT (US); Alexander Joseph Vallee, Jr., Clifton Park, NY (US); Stefaan Guido Van Nieuwenhove, Hohenkammer (DE); Yosang Yoon, Green Island, NY (US)

(73) Assignee: General Electric Company, Niskayuna, NY (US)

( * ) Notice: Subject to any disclaimer, the term of this patent is extended or adjusted under 35 U.S.C. 154(b) by 6 days.

(21) Appl. No.: 12/575,668

(22) Filed: Oct. 8, 2009

(65) Prior Publication Data

US 2011/0083605 A1    Apr. 14, 2011

(51) Int. Cl.
  *B05C 5/00*    (2006.01)
  *B05B 7/06*    (2006.01)
  *B05B 11/00*   (2006.01)
  *B32B 5/02*    (2006.01)

(52) U.S. Cl. ........ 118/325; 118/313; 118/315; 118/316; 118/712; 118/665; 156/351; 156/361

(58) Field of Classification Search .......... 118/313–316, 118/302, 325, 665, 679–684, 686, 420, 411, 118/428, 429, 307, 712, 713; 427/8, 421.1, 427/214, 215–217, 220–222; 156/64, 351, 156/361, 440, 578

See application file for complete search history.

(56) References Cited

U.S. PATENT DOCUMENTS

| | | | |
|---|---|---|---|
| 5,110,395 A | 5/1992 | Vaniglia | |
| 5,366,527 A * | 11/1994 | Amos et al. | 65/382 |
| 5,654,031 A * | 8/1997 | Delmore et al. | 427/8 |
| 5,700,347 A | 12/1997 | McCowin | |
| 5,766,357 A * | 6/1998 | Packer et al. | 118/420 |
| 6,026,883 A | 2/2000 | Hegerhorst et al. | |
| 6,248,175 B1 * | 6/2001 | Subramanian et al. | 118/712 |
| 6,467,521 B1 * | 10/2002 | Pratt | 156/351 |
| 6,964,561 B2 | 11/2005 | Louderback et al. | |
| 7,413,694 B2 | 8/2008 | Waldrop, III et al. | |
| 2007/0044922 A1 | 3/2007 | Mischler et al. | |

OTHER PUBLICATIONS

M. J. Shuart et al., "Automated Fabrication Technologies for High Performance Polymer Composites," Technical Report: NASA-98-AGARD, 1998.

\* cited by examiner

*Primary Examiner* — Yewebdar Tadesse
(74) *Attorney, Agent, or Firm* — Penny A. Clarke

(57) ABSTRACT

An application and infusion system for applying a resin to one or more fiber tows and for infusing the fiber tows with the resin, wherein each of the fiber tows is moving at a respective fiber speed. The application and infusion system includes a deposition and infusion system comprising one or more nozzles configured to deposit the resin on a respective one of the fiber tows. The system further includes a controller configured to control a flow rate of the resin through each of the nozzles relative to the fiber speed of the respective ones of the fiber tows. Other aspects of the application and infusion system are also provided.

20 Claims, 4 Drawing Sheets

RESIN APPLICATION AND INFUSION SYSTEM

BACKGROUND

The invention relates generally to systems for applying and infusing resins for composite materials and, more particularly, to systems for controllably applying and infusing resins onto individual fiber tows.

Resin infused fiber composite materials are being used increasingly in a variety of diverse industries, such as automotive, aircraft, and wind-energy, in part, because of their low weight and high strength properties. It would be desirable to form complex composite components and/or fiber patterns. However, current manufacturing processes typically involve the use of fiber pre-forms with subsequent resin infusion, or preimpregnated fiber tows called "prepreg". Both of these methods have drawbacks.

Currently, efforts are underway to provide infusion of an array of fiber tows using systems including rollers with resin flowing through holes in the rollers from the bore to the outside surface. However, these systems do not permit control of the infusion of individual tows.

It would therefore be desirable to provide an improved system that permits control of the resin infusion of individual tows. In addition, it would be desirable for the system to facilitate real time in-line infusion for an array of dry fiber tows for formation of complex composite components.

BRIEF DESCRIPTION

Briefly, one aspect of the present invention resides in an application and infusion system for applying a resin to one or more fiber tows and for infusing the fiber tows with the resin. Each of the fiber tows is moving at a respective fiber speed. The application and infusion system includes a deposition and infusion system comprising one or more nozzles configured to deposit the resin on a respective one of the fiber tows. The application and infusion system further includes a controller configured to control a flow rate of the resin through each of the nozzles relative to the fiber speed of the respective ones of the fiber tows.

Another aspect of the invention resides in an application and infusion system for applying a resin to multiple fiber tows and for infusing the fiber tows with the resin. Each of the fiber tows is moving at a respective fiber feed rate. The application and infusion system includes a deposition and infusion system comprising a plurality of nozzles, wherein each of the nozzles is configured to deposit the resin on at least one of the fiber tows. The application and infusion system further includes a controller configured to control a flow rate of the resin through each of the nozzles relative to the fiber speed of the respective ones of the fiber tows using feedback based on measurement data of at least one of a resin width and a resin thickness for respective ones of the fiber tows.

DRAWINGS

These and other features, aspects, and advantages of the present invention will become better understood when the following detailed description is read with reference to the accompanying drawings in which like characters represent like parts throughout the drawings, wherein:

FIG. 1 schematically depicts in side view, a resin application and infusion system integrated in a fiber placement system;

FIG. 2 schematically depicts in top view, an example array of fiber tows for the fiber placement system shown in FIG. 1;

FIG. 3 schematically depicts an example array of nozzles for use in the resin application and infusion system of FIG. 1;

DETAILED DESCRIPTION

Figure 1:
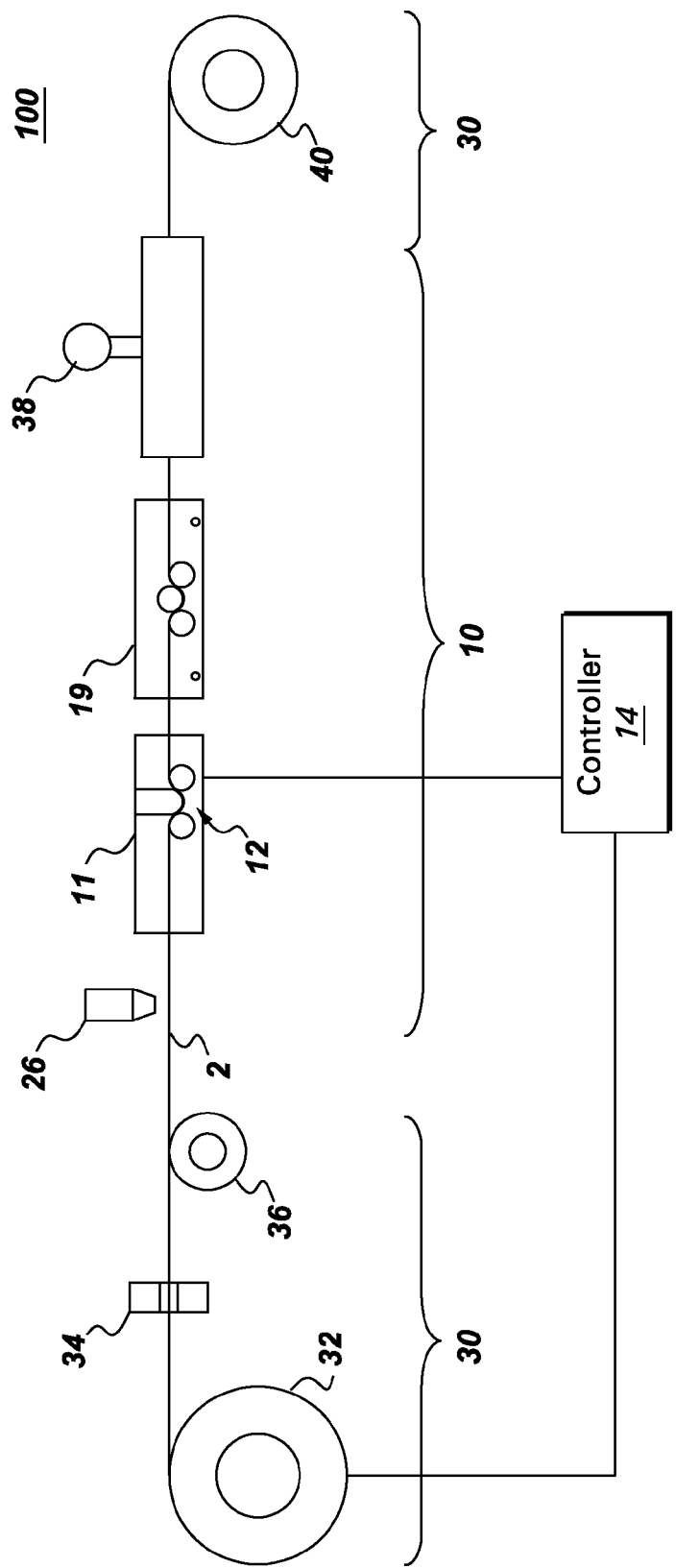

A system 10 for applying a resin 4 to one or more fiber tows 2 and for infusing the fiber tows with the resin is described generally with reference to FIG. 1. The invention is not limited to specific resins or fiber types. However, in one non-limiting example, the resin is an epoxy resin, and the tows comprise carbon fibers. The resin application and infusion system 10, an example arrangement of which is shown in FIG. 1, can be integrated into a fiber placement system 30 to form a composites manufacturing machine 100. This arrangement enables real-time, inline infusion of an array of dry fiber tows, with control of the resin application (and consequently infusion) rate for each of the tows, based on part specific requirements. The resulting machine 100 can be used to fabricate composite structures, non-limiting examples of which include low weight, high strength aircraft and automotive components.

Figure 2:

Before describing the resin application and infusion system 10 in detail, aspects of an example fiber placement system 30 are discussed to provide context. For the example arrangement shown in FIG. 1, the fiber placement system 30 includes dispensing means 32 for feeding multiple fiber tows 2, where each of the fiber tows is moving at a respective fiber speed. More particularly, the dispensing means 32 are configured to separately feed each of the tows 2, such that the tows 2 can be fed at different rates. For example, the fiber speed may be zero in some instances for one or more of the fiber tows, while others of the tows are moving. In one non-limiting example, the dispensing means 32 comprise multiple spools 32. For ease of illustration only one spool 32 is shown in FIG. 1. Each of the tows 2 in the array of tows is initially wound on a respective one of the spools 32. For the example arrangement of FIG. 1, each of the tows 2 passes through a respective eyelet 34. For ease of illustration, only one eyelet 34 is shown in FIG. 1. However, typically one eyelet 34 is provided for each of the tows 2 in the array. The tows 2 then move through a width-controlling roller 36. FIG. 2 schematically depicts in top view, an example array of fiber tows 2 arranged on the roller 36. The roller 36 typically includes multiple notches (not shown) for receiving and guiding respective ones of the fiber tows 2, which are shaped to provide control over the tow width exiting the roller. Such control is helpful to ensure proper infusion of the entire tow across its width, as well as proper tow size for the tow handling apparatus in the fiber placement head. Although the example array in FIG. 2 comprises eight tows, the invention is not limited to a specific array size or tow count, and for certain applications it may comprise less than eight tows, and for other applications may comprise more than eight tows.

Figure 3:
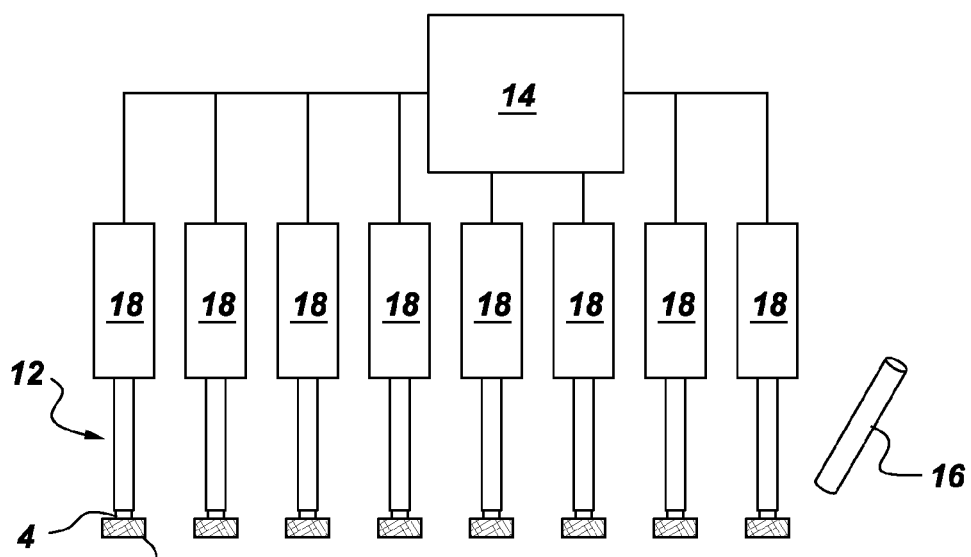

The fiber tows 2 move from the width roller 36 to the application and infusion system 10. As indicated in FIG. 1, the application and infusion system 10 includes a deposition system 11 comprising one or more nozzles 12 configured to deposit the resin 4 on a respective one of the fiber tows 2. An example array of nozzles 12 is shown in FIG. 3. For the arrangement of FIG. 3, one nozzle is provided for each of the fiber tows 2. The invention is not limited to any specific arrangement of nozzles. Additional aspects of the deposition and infusion system 11 are discussed below with reference to FIGS. 4-6.

As indicated in FIG. 1, the application and infusion system 10 further includes a controller 14 configured to control a flow rate of the resin through each of the nozzles 12 to provide the desired resin content based on the fiber speed of the respective ones of the fiber tows 2. The controller 14 may exchange information with the fiber placement system 30, as indicated in FIG. 1, to optimize the infusion for any laydown sequence. While separate controllers may be employed for the application and infusion system 10 and for the fiber placement system 30, this control integration is required. In some embodiments, the controller 14 may comprise one or more processors. It should be noted that the present invention is not limited to any particular processor for performing the processing tasks of the invention. The term "processor," as that term is used herein, is intended to denote any machine capable of performing the calculations, or computations, necessary to perform the tasks of the invention, and to control the mechanical and electrical devices in the invention. The term "processor" is intended to denote any machine that is capable of accepting a structured input and/or of processing the input in accordance with prescribed rules to produce an output, as will be understood by those skilled in the art.

As shown in FIG. 1, the application and infusion system 10 may further include an infusion enhancer 19 for enhancing the infusion of the fiber tows 2 with the resin 4. Additional aspects of the deposition and infusion system 11 are discussed below with reference to FIGS. 7-9.

For certain embodiments, the controller 14 is further configured to control the flow rate of the resin through each of the nozzles 12 using feedback based on measurement data of resin width and/or resin thickness for respective ones of the fiber tows 2. For the example configuration depicted in FIG. 3, the application and infusion system 10 further includes one or more sensors 16 for monitoring at least one of the resin width and the resin thickness. Although only one sensor 16 is indicated in FIG. 3 for ease of illustration, multiple sensors 16 may be employed, and in one non-limiting example, one sensor 16 is provided for each of the fiber tows 2. Example sensors include optical or contact sensors.

For the example configuration depicted in FIG. 3, the deposition system 11 further comprises one or more computer controlled pumps 18. For the illustrated embodiment, each of the pumps 18 is configured to supply the resin 4 to respective ones of the nozzles 12. More particularly, a separate pump 18 is provided for each of the nozzles 12, for the illustrated example. As indicated, each of the pumps 18 is controlled by the controller 14. In other configurations, at least one of the pumps 18 may be equipped with multiple valves (not shown) to control flow of the resin from the pump 18 to multiple nozzles 12. For example, each of the pumps 18 may be used to deliver resin to multiple nozzles 12. In one non-limiting example, the pumps 18 are positive displacement pumps. In particular examples, positive displacement pumps with little leakage are employed. The pump(s) 18 may be connected to the nozzles 12 by tubing or pipes (not shown).

For particular embodiments, the controller 14 is further configured to receive fiber feed rate signals for the respective fiber tows 2 and to control the pumps 18 based at least in part on the fiber feed rate signals for the respective ones of the fiber tows. For certain embodiments, the fiber tows have different fiber feed rates, such that the controller 14 applies different control signals to the respective pumps 18. The fiber speed may be zero in some instances for one or more of the fiber tows. In one non-limiting example, the fiber feed rate signals are read from a metering roller (not shown). The metering roller could be adjacent to spool 32 in FIG. 1 or elsewhere along the tow path.

Figure 4:
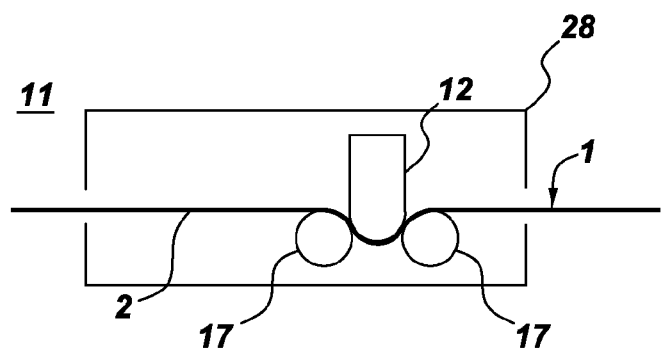
FIG. 4 illustrates an example nozzle configuration for a deposition and infusion system, for use in the resin application and infusion system of FIG. 1.
Figure 5:
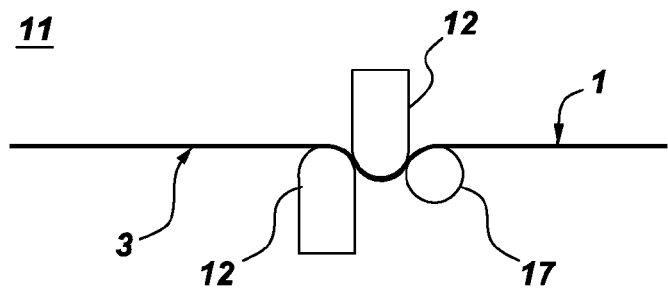
FIG. 5 illustrates another example configuration for a deposition and infusion system, for use in the resin application and infusion system of FIG. 1.
Figure 6:
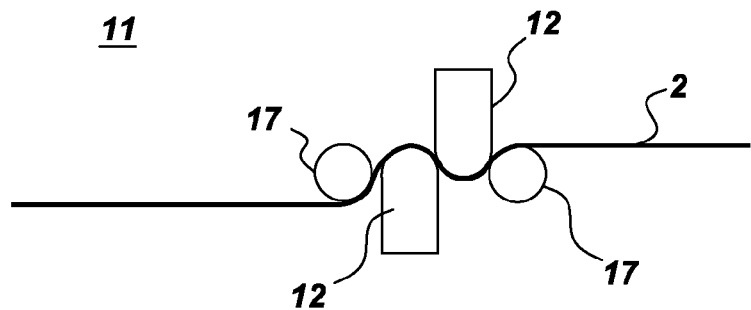
FIG. 6 illustrates another example configuration for a deposition and infusion system, for use in the resin application and infusion system of FIG. 1.

The specific configuration of the deposition and infusion system 11 may vary based on the application. However, FIGS. 4-6 illustrate three example configurations for the deposition and infusion system 11. For the arrangement shown in FIG. 4, the nozzles 12 are configured to deposit the resin on only one side 1,3 of the fiber tows 2. More particularly, for the illustrated arrangement, the nozzles 12 are configured to deposit the resin 4 on only the upper side 1 of the fiber tows 2. As shown in FIG. 4, the example deposition and infusion system 11 further includes multiple rods 17 oriented parallel to one another in a direction substantially transverse to a feed path of the fiber tows 2. As indicated the nozzles 12 are disposed between the rods 17, and the rods 17 are configured to press the fiber tows 2 against the nozzles 12. Example materials for the rods 17 include hardened steel or other metals with hard coatings; rods should be smooth to limit the drag and resulting fiber tension as well as wear. The position of the nozzle relative to the rods can be optimized to provide the required pressure and residence time to accomplish infusion while limiting the fiber tension to a desired value.

For the configurations shown in FIGS. 5 and 6, the nozzles 12 are configured to deposit the resin on both an upper side and a lower side 1,3 of the fiber tows 2. For the configuration shown in FIG. 5, the deposition and infusion system 11 further includes a rod 17 oriented in a direction substantially transverse to a feed path of the fiber tows 2. As indicated, the nozzles 12 are arranged in two rows, and the rod 17 is disposed aft of the two rows of nozzles 12. For the illustrated arrangement, the nozzles 12 in the first rows are configured to deposit the resin 4 on the lower sides 3 of the fiber tows 2, and the nozzles 12 in the second row are configured to deposit the resin on the upper sides 1 of the fiber tows. For other configurations, the first row of nozzles may deposit resin on the upper sides of the tows, and the second row of nozzles may deposit resin on the lower side of the tows. As indicated, the rod 17 is configured to press the fiber tows 2 against the nozzles 12. For these arrangements, the infusion depth into the tow from each face can be roughly half of that for single-sided infusion.

For the configuration shown in FIG. 6, the deposition and infusion system 11 further includes multiple rods 17 oriented parallel to one another, in a direction substantially transverse to a feed path of the fiber tows 2. More particularly, the illustrated arrangement includes two rods 17. As indicated, the nozzles 12 are arranged in two rows disposed between the two rods 17. For the illustrated arrangement, the nozzles 12 in the first row are configured to deposit the resin 4 on the lower sides 3 of the fiber tows, and the nozzles 12 in the second row are configured to deposit the resin on the upper sides 1 of the fiber tows 2. For other configurations, the first row of nozzles may deposit resin on the upper sides of the tows, and the second row of nozzles may deposit resin on the lower side of the tows. As indicated, the rods 17 are configured to press the fiber tows 2 against the nozzles 12. This configuration provides additional contact length along the arc of the upstream nozzle compared with the arrangement in FIG. 5. This additional contact length should promote improved infusion.

Figure 7:
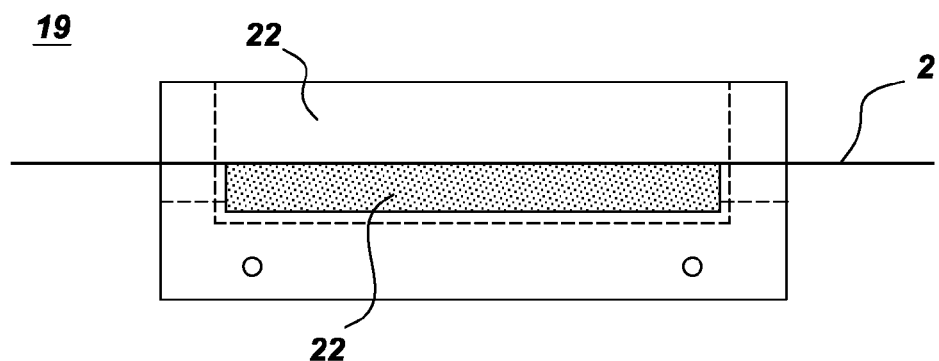
FIG. 7 illustrates an example configuration for an infusion enhancer, for use in the resin application and infusion system of FIG. 1.
Figure 8:
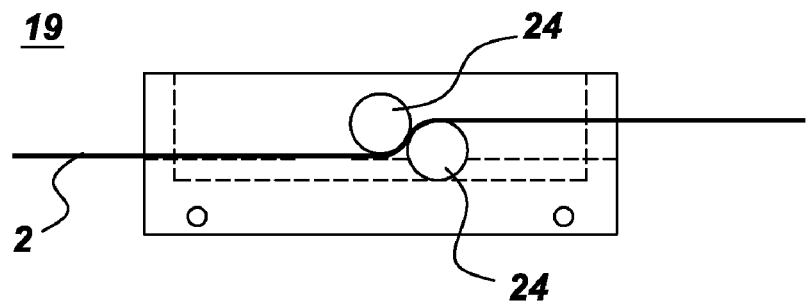
FIG. 8 illustrates another example configuration for an infusion enhancer, for use in the resin application and infusion system of FIG. 1.
Figure 9:
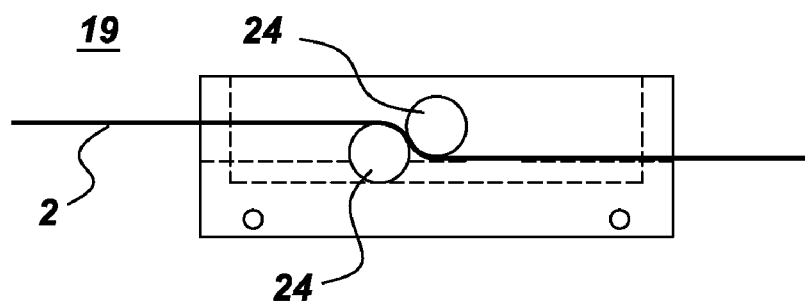
FIG. 9 illustrates another example configuration for an infusion enhancer, for use in the resin application and infusion system of FIG. 1.

FIGS. 7-9 illustrate three example configurations for the infusion enhancer. However, the specific configuration of the infusion enhancer 19 may vary based on the application. For the arrangement shown in FIG. 7, the infusion enhancer 19 comprises a pair of platen 22. As indicated, the fiber tows 2 extend between the platen 22. Beneficially, the platen 22 press the resin into the fiber tows 2, thereby enhancing the infusion of the resin into the tows.

For the configuration shown in FIG. 8, the infusion enhancer 19 comprises multiple rods 24 oriented parallel to one another in a direction substantially transverse to a feed path of the fiber tows 2. The rods 24 may be formed of hardened steel or other metals with hard coatings; rods should be smooth to limit the drag and resulting fiber tension as well as wear. The position of the nozzle relative to the rods can be optimized to provide the required pressure and residence time to accomplish infusion while limiting the fiber tension to a desired value. As indicated, the fiber tows 2 extend below the first rod, between the rods, and above the second rod, such that the rods press the resin at least partially into the fiber tows. Alternatively, the rods 24 may be configured as shown in FIG. 9. The arrangement of FIG. 9 is similar to that of FIG. 8, except that the fiber tows extend above the first rod, between the rods, and below the second rod, such that the rods press the resin at least partially into the fiber tows. The arrangements shown in FIGS. 7-9 provide various trade-offs between the length of tow being enhanced and the resulting drag.

For the example arrangement illustrated in FIG. 1, the application and infusion system 10 further includes a heat source 26 configured to heat the fiber tow 2 before the resin is deposited. In one non-limiting example, the deposition and infusion system 11 is disposed in a heated manifold 28 to enhance wetting of the resin onto the tows. A heated manifold 28 is shown, for example, in FIG. 4 and may be included for other embodiments of the deposition and infusion system 11, as well. The heat source 26 may heat the fiber tows by contact or alternatively may heat the tows indirectly by heating the environment through which the tows pass; radiant heat may also be employed. Non-limiting examples of heat source 26 include quartz lamps, forced hot air in a small channel, or a heated roller.

After passing through the infusion enhancer 19, the resin infused fiber tows 2 are fed through a cooling module 38, for the fiber placement system 30 illustrated in FIG. 1. Non-limiting examples of cooling module 38 include an air cooler and coolers sold under the trade name Vortex Coolers by ITW Air Management, having a place of business in Cincinnati, Ohio. For certain embodiments, the cooling module cools the resin infused tows to a temperature in a rage of about 40 F to about 70 F. For the configuration shown in FIG. 1, the cooled, resin-infused fiber tows 2 are then taken up on a mandrel 40, to be used as pre-impregnated fiber to form a resin infused fiber structure (not shown).

Beneficially, by integrating the resin application and infusion system 10 into the fiber placement system 30, advanced composite structures can be fabricated, despite having complex shapes requiring tow starts, stops, adds and drops. The resulting fiber placement system utilising the in-line resin application and infusion system of the present invention can fabricate these complex composite structures with improved control and at lower cost than conventional fiber placement systems.

Although only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. An application and infusion system for applying a resin to one or more fiber tows and for infusing the fiber tows with the resin, wherein each of the fiber tows is moving at a respective fiber speed, the application and infusion system comprising:
   a deposition and infusion system comprising one or more nozzles configured to deposit the resin on a respective one of the fiber tows;
   an infusion enhancer contacting the fiber tows, wherein said infusion enhancer places pressure on the fiber tows for infusing the fiber tows with the resin a plurality of rods oriented parallel to one another in a direction substantially transverse to a feed path of the fiber tows, wherein the one or more nozzles are disposed between the rods, and wherein the plurality of rods is configured to press the fiber tows against the nozzles; and
   a controller configured to control a flow rate of the resin through each of the nozzles relative to the fiber speed of the respective ones of the fiber tows.

2. The application and infusion system of claim 1, wherein the controller is further configured to control the flow rate of the resin through each of the nozzles using feedback based on measurement data of at least one of a resin width and a resin thickness for respective ones of the fiber tows.

3. The application and infusion system of claim 2, further comprising one or more sensors for monitoring at least one of the resin width and the resin thickness.

4. The application and infusion system of claim 2, wherein the deposition and infusion system further comprises one or more computer controlled pumps, wherein each of the pumps is configured to supply the resin to respective ones of the nozzles, and wherein each of the pumps is controlled by the controller.

5. The application and infusion system of claim 1 configured for infusing a plurality of fiber tows, wherein each of the nozzles is configured to deposit the resin on only one of the fiber tows.

6. The application and infusion system of claim 1, wherein the nozzles are configured to deposit the resin on only one side of the fiber tows.

7. The application and infusion system of claim 1, wherein the nozzles are configured to deposit the resin on both an upper side and a lower side of the fiber tows.

8. The application and infusion system of claim 7, wherein the nozzles are arranged in two rows with one of the rods being disposed aft of the two rows of nozzles, wherein the nozzles in a first one of the rows are configured to deposit the resin on one of the sides of the fiber tows, wherein the nozzles in a second one of the rows are configured to deposit the resin on the other side of the fiber tows, and wherein one of the rods is configured to press the fiber tows against the nozzles.

9. The application and infusion system of claim 8, wherein the nozzles are arranged in two rows disposed between two of the rods, wherein the nozzles in a first one of the rows are configured to deposit the resin on one of the sides of the fiber tows, wherein the nozzles in a second one of the rows are configured to deposit the resin on the other side of the fiber tows, and wherein the rods are configured to press the fiber tows against the nozzles.

10. The application and infusion system of claim 1, wherein the infusion enhancer comprises a pair of platens, and wherein the fiber tows extend between the platens.

11. The application and infusion system of claim 1, wherein the fiber tows extend below a first one of the rods, between the rods, and above a second one of the rods, and wherein the rods press the resin at least partially into the fiber tows.

12. The application and infusion system of claim 1, wherein the fiber tows extend above a first one of the rods, between the rods, and below a second one of the rods, and wherein the rods press the resin at least partially into the fiber tows.

13. The application and infusion system of claim 1, further comprising a heat source configured to pre-heat the fiber tows before the resin has been deposited on the fiber tows.

14. An application and infusion system for applying a resin to a plurality of fiber tows and for infusing the fiber tows with the resin, wherein each of the fiber tows is moving at a respective fiber feed rate, the application and infusion system comprising:
   a deposition and infusion system comprising a plurality of nozzles, wherein each of the nozzles is configured to deposit the resin on at least one of the fiber tows;
   an infusion enhancer contacting the fiber tows, wherein said infusion enhancer places pressure on the fiber tows for infusing the fiber tows with the resin a plurality of rods oriented parallel to one another in a direction substantially transverse to a feed path of the fiber tows, wherein the one or more nozzles are disposed between the rods, and wherein the plurality of rods is configured to press the fiber tows against the nozzles; and
   a controller configured to control a flow rate of the resin through each of the nozzles relative to the fiber speed of the respective ones of the fiber tows using feedback based on a plurality of measurement data of at least one of a resin width and a resin thickness for respective ones of the fiber tows.

15. The application and infusion system of claim 14, further comprising one or more computer controlled pumps, wherein each of the pumps is configured to supply the resin to ones or more of the nozzles, and wherein each of the pumps is controlled by the controller.

16. The application and infusion system of claim 15, wherein the controller is further configured to receive a plurality of fiber feed rate signals for the fiber tows and to control the pumps based at least in part on the fiber feed rate signals for the respective ones of the fiber tows.

17. The application and infusion system of claim 15, wherein two or more of the fiber tows have different ones of the fiber feed rates, such that the controller applies different control signals to the respective pumps.

18. The application and infusion system of claim 15, wherein at least one of the pumps is equipped with a plurality of valves to control flow of the resin from the pump to a respective plurality of the nozzles.

19. The application and infusion system of claim 14 wherein the infusion enhancer comprises a pair of platens or a plurality of rods oriented parallel to one another in a direction substantially transverse to a feed path of the fiber tows.

20. The application and infusion system of claim 19, wherein the fiber tows extend below a first one of the rods, between the rods, and above a second one of the rods or the fiber tows extend above a first one of the rods, between the rods, and below a second one of the rods, and wherein the rods press the resin at least partially into the fiber tows.

* * * * *